May 29, 1934. H. A. WHITESIDE 1,960,470
BRUSH RIGGING AND END CAP ASSEMBLY FOR SURGICAL MOTORS AND THE LIKE
Original Filed June 5, 1926
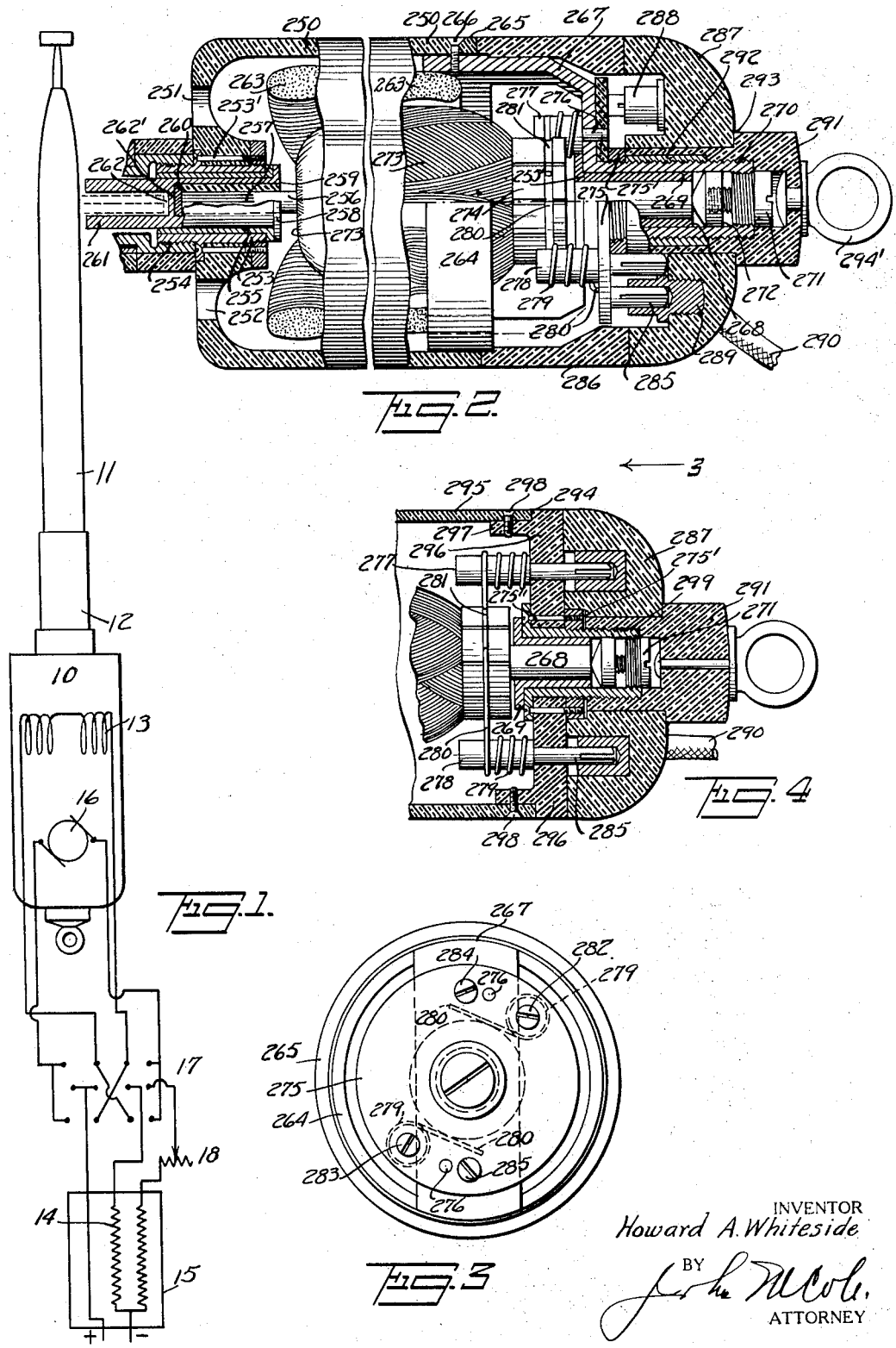
INVENTOR
Howard A. Whiteside
BY
ATTORNEY Patented May 29, 1934

1,960,470

UNITED STATES PATENT OFFICE 1,960,470

BRUSH RIGGING AND END CAP ASSEMBLY FOR SURGICAL MOTORS AND THE LIKE

Howard A. Whiteside, New York, N. Y.

Original application June 5, 1926, Serial No. 113,885. Divided and this application December 14, 1931, Serial No. 580,920

14 Claims. (Cl. 172—36)

The present invention relates to brush rigging and end cap assemblies for surgical motors and the like, and is more particularly directed toward such an assembly of brush rigging and end cap for use in motorized tool units such as surgical and dental drills and other smaller tools, such as in jewelers' drills, engravers' tools and the like.

The present invention contemplates providing a motor having a casing with an open end with an adjustable brush rigging fixedly secured in adjusted position across the open end of the casing and located so as to hold brushes carried by the brush rigging on the commutator. This brush rigging disk also carries rearwardly extending current carrying members for the brush rigging (and generally for the field), while an end cap carrying current supply wires is provided with terminals on its inner face cooperative with the current carrying members carried by the brush carrying disk. One or the other of these parts, that is either the brush rigging or end cap part of the assembly, may support the bearing for the armature shaft in the motor. According to the construction herein disclosed in detail, this bearing is supported from the brush rigging part of the assembly.

The present invention contemplates securing the end cap in position beyond the brush carrying disk so that the entire motor may be a unit suitable for being held in the hand while carrying out surgical and other operations. These motors generally are constructed so that the field and armature windings are separately connected to an external controller and this requires the employment of four terminals. In order that it should be impossible to erroneously connect the field and armature circuits, the terminals are preferably arranged in an asymmetric manner compelling the proper assembly of the parts.

The invention also contemplates the provision of a thrust bearing carried by the assembly so as to hold the armature shaft toward the front end of the motor.

Further objects of the invention relate to the provision of the brush rigging device per se as well as the end cap per se.

The present application is a division of my co-pending application Serial Number 113,885, filed June 5, 1926, on which Patent No. 1,836,350 issued December 15, 1931.

The accompanying drawing shows, for purposes of illustrating the present invention, two of the many possible embodiments in which it may take form, it being understood that the drawing is illustrative of the invention rather than limiting the same.

In the drawing:

Figure 1 is a diagrammatic view illustrating a miniature electric motor applied to a dental or surgical tool, together with a wiring diagram;

Figure 2 is an enlarged sectional view of the motor, a portion of the brush rigging supporting yoke being omitted for clearness;

Figure 3 is an end view taken in the direction of the arrow 3 of Figure 2, the end cap and insulating sleeve having been removed from the motor, and Figure 4 is a sectional view of a different form of brush rigging and bearing assembly.

A motorized tool unit such as contemplated by the present invention is indicated in Figure 1. The motor casing is indicated at 10. It is detachably and operably connected with a surgical hand piece 11 by means of a slip joint 12. The motor, slip joint and tool form a motorized tool unit which can be conveniently held in the hand by the operator while using the instrument. Motors for such purposes must be comparatively small in order that the operator can manipulate the tool unit. Where such motors are commutator motors the windings may be shunt or series. They may be wound for operation from a low voltage battery or from power lighting mains.

Where a shunt motor is to be operated from power mains, such as 110 volt house lighting mains, the motor field 13 is preferably designed to use but a small part of the light potential, the most of the potential drop being consumed in a fixed resistance 14 carried in a resistance adapter 15 adapted to be plugged into a receptacle. In this manner the inductance of the field circuit of a motor may be kept comparatively low and the power factor of the field circuit may be relatively high. The resistances and inductances as well as the dimensions of the motor may be so proportioned by calculation that the armature current will be approximately in phase with the field current so as to develop torque on alternating current.

Where the motor is designed for power or lighting mains, the armature 16 may be designed to stand the full voltage. The resistance adapter, motor field, and armature are interconnected by a controller designated generally by the reference character 17 by which the motor may be started, stopped and reversed. The speed may also be varied by a variable resistance 18 in the armature circuit. Where reverse operation is unnecessary, a simple make and break switch may be used. It will of course be understood that the proportioning of and disposition of the various resistances will be dependent upon the characteristics of the motor, the size and dimensions of its parts, the voltage of the power supply, frequency, and other variables. The accurate determination of these variables is essential to secure satisfactory operation in alternating current.

An insulating casing 250 is preferably used to form the outside of the motor, as well as to support the field structure and the bearings for the armature shaft. As shown in Figures 1 and 2, the end of the motor to which the hand piece above referred to, is attached, is provided with a permanently closed end wall 251 having ventilation openings 252 if desired, and carrying a metal bushing 253 preferably made of light metal. This bushing is permanently secured in the end of the motor housing in any suitable manner, as for example, by a screw 253'. The exposed end of the bushing 253 is preferably threaded as indicated at 254 to receive a coupling or slip joint used in the hand piece. A case hardened steel bearing member 255 is carried inside the bushing 253 so as to provide a wear resistant bearing having minimum friction.

The left end of the armature shaft 258 may be kerfed as indicated at 257 and is insulatively mounted in a bearing member 258 by an insulating sleeve 259 and an insulating washer 250. This bearing member 258 is drilled in from the right, as indicated, to provide a recess to receive the washer and insulating sleeve, and the washer and tube previously treated with suitable varnish are inserted in place and the shaft 256 is forced in and the parts allowed to dry. The exposed end of the bearing member has a pair of driving dogs 261 to cooperate with the hand piece. It is preferably recessed at 262 to receive a split pin carried by the hand piece, a closed wall 262' being provided to prevent oil from passing from the hand piece into the insulating coupling.

The insulating casing 250 forms a rigid self-supporting housing for the motor, is an integral part of the motor and directly supports the armature shaft bearings and the field structure indicated at 263. The field structure is preferably made out of very thin laminations of silicon steel, and a field winding of few turns is preferred, so as to improve the power factor of the field circuit. In making up the motor the inside of the casing is accurately turned to size and the field structure and windings forced into place and held thereby suitable varnish thereby accurately centering the same.

As shown at the right of Figure 3 and in Figure 4, a metal ring 264 is passed into the open end 265 of the motor housing and may be held in place by a number of screws 266. This ring 264 is provided with a yoke 267 which supports the brush rigging and the adjacent end 268 of the armature shaft. As here shown this end of the shaft is carried in a case hardened, steel bushing 255' carried in the tubular end 270 of the yoke 267. A screw 271 is threaded into the end 270 of the yoke and a spring pressed plunger 272 is utilized to urge the shaft to the left and to hold the shoulder on the bearing 258 against the bearing at the other end of the motor.

The armature 273 and commutator 274 are carried on the armature shaft 256 in the usual manner. An insulating disk or washer 275 is carried on the yoke 267 and is fastened to it by a lock nut 275' and by pins, one of which is indicated at 276. This insulating disk carries a pair of conducting posts 277 and 278 about each of which is wound a coiled spring 279 preferably made of steel music wire. These springs each have free ends 280 which are adapted to ride in a groove 281 in the commutator, the springs thereby acting as brushes. The opposite ends of the springs are anchored in holes in the insulating disk 275. The posts 277 and 278 extend through the insulating disk and are provided with terminals 282 and 283. Similar terminals 284 and 285 are carried by the insulating disk, all the terminals projecting toward the right as indicated in full lines in Figures 2 and 3. The terminals 284 and 285 provide connections for the field leads, the field connection in the motor being soldered to these terminals.

An insulating ring 286 is adapted to be slipped onto the motor so as to surround the brush rigging and yoke and to be supported on the yoke. An insulating cap 287 is provided with four receptacle contacts, two of which are indicated at 288 and 289. These receptable contacts are placed so that they may be connected with the field and armature terminals 282, 283, 284 and 285. By placing these terminals asymmetrically, it is obvious that the cap 287 can not be connected so as to confuse the armature and field connections. This insulating cap preferably carries the flexible cord indicated at 290, which cord carries the four wires leading to the controller. In order to secure the cap 287 in place without imposing any strain upon the brush rigging, an insulating coupling member 291 is provided with a threaded metal sleeve 292 adapted to cooperate with threads on the outside of tubular end 268 of the yoke. This coupling member 291 has a shoulder indicated at 293 to engage the cap 287 and hold it in place in an obvious manner. This coupling member may also be provided with a swiveled eye 294' to facilitate hanging the motorized unit on a suitable hook when not in use.

As the motor contemplated by the present invention is preferably a reversible one, it is necessary to accurately adjust the brush rigging so as to place the brushes in the neutral zone for good commutation. This may be accomplished by adjusting the disk 275 and contacts and brushes carried by it as a unit until proper commutation is obtained. While the parts are held against relative movement, holes are drilled for the pins 276, which pins are used to secure the brush carrier in proper angular position. The yoke 267 is constructed so as to open at the sides so as to permit observation of the motor and to reduce the weight.

A modified form of motor is shown in Figure 4. Here the end 294 of the motor casing 295 extends over as far as the right end of the insulating ring 286 of Figure 2. An insulating disk 296 having a tubular flange 297 is attached to the end of the motor casing by screws 298. The holes for these screws are not drilled until after the disk 296 has been rocked back and forth to the position for proper commutation. The disk 296 carries a light metal tubular bearing holder 299 corresponding with the tubular end 270 of the yoke 267, these parts being clamped together by lock nut 275' and screw 275″. This disk 296 carries the brush rigging in the same manner as the disk 275, the parts being given the same reference characters. It also carries the case hardening bearing and cap thrust bearing and supporting eye as in Figure 2.

In assembling this form of motor, the armature commutator, and disk 296 are assembled and the brushes placed on the commutator. The brushes are adjusted to the neutral position before the screws 298 are placed.

It is possible to construct a motor as above described and make it sufficiently small to be attached directly to the hand piece of a surgical tool. For example a motor suitable for dental work may be 1″ in diameter by 2½″ long over all and weight less than three ounces. Carefully proportioning the parts and accurate assembly permits the motor to operate on power mains at the high speeds used by dental tools without appreciable heating or vibration on direct or alternating currents. The motor is completely insulated from the operator's hand by the insulating casing while the insulating joint in the armature shaft protects the patient from any shock on account of leakage from the windings.

It will of course be understood that the wiring diagram above described for permitting operation of a shunt wound motor on alternating current from house lighting mains may be dispensed with when the motor is to be operated from a direct current source only. Furthermore a metal cased motor may be used instead of a motor having an insulating case where matters of insulation are unimportant.

It is obvious that the invention may be embodied in many forms and constructions, and I wish it to be understood that the particular forms shown are but a few of the many forms. Various modifications and changes being possible, I do not limit myself in any way with respect thereto.

What is claimed is:

1. In a miniature motor, the combination with a stationary motor casing having an open end at the rear, and a revolvable armature shaft carrying a commutator, of a combined brush rigging and end cap assembly in two parts, one part comprising a pre-adjustable brush rigging fixedly secured in adjusted position across the open end of the motor casing and including a brush carrying disk located to hold brushes carried thereby on the commutator, said disk also carrying rearwardly extending current carrying members, the other part comprising an end cap carrying a current supply cable having wires connected to terminals disposed on the inner face of the end cap and spaced to cooperate with the current carrying members, a bearing carried by one of said parts for supporting one end of the armature shaft, and means to secure the end cap in position beyond the brush carrying disk.

2. In a miniature motor, the combination with a stationary motor casing having an open end at the rear, and a revolvable armature shaft carrying a commutator, of a combined brush rigging and end cap assembly in two parts, one part comprising a pre-adjustable brush rigging fixedly secured in adjusted position across the open end of the motor casing and including a brush carrying disk located to hold brushes carried thereby on the commutator, said disk also carrying rearwardly extending current carrying members, the other part comprising an end cap carrying a current supply cable having wires connected to terminals disposed on the inner face of the end cap and spaced to cooperate with the current carrying members, a bearing carried by one of said parts for supporting one end of the armature shaft, and means to secure the end cap in position beyond the brush carrying disk, said means including axially extending screw threaded parts which force the end cap toward the motor casing.

3. In a miniature motor, the combination with a stationary motor casing having an open end at the rear, and a revolvable armature shaft carrying a commutator, of a combined brush rigging and end cap assembly in two parts, one part comprising a pre-adjustable brush rigging fixedly secured in adjusted position across the open end of the motor casing and including a brush carrying disk located to hold brushes carried thereby on the commutator, said disk also carrying rearwardly extending current carrying members, the other part comprising an end cap carrying an eccentrically located current supply cable having wires connected to terminals disposed on the inner face of the end cap and spaced to cooperate with the current carrying members, a bearing carried by one of said parts for supporting one end of the armature shaft, the end cap having an axial opening to receive said bearing, and means to secure the end cap in position beyond the brush carrying disk.

4. In a miniature motor, the combination with a stationary motor casing having an open end at the rear, and a revolvable armature shaft carrying a commutator, of a combined brush rigging and end cap assembly in two parts, one part comprising a pre-adjustable brush rigging fixedly secured in adjusted position across the open end of the motor casing and including a brush carrying disk located to hold brushes carried thereby on the commutator, said disk also carrying four rearwardly extending current carrying members, two of which are connected to the brushes and two of which provide field connections, the other part comprising an end cap carrying a current supply cable having a wire connected to each of four terminals disposed on the inner face of the end cap and spaced to cooperate with the current carrying members, a bearing carried by one of said parts for supporting one end of the armature shaft, and means to secure the end cap in position beyond the brush carrying disk.

5. In a miniature motor, the combination with a stationary motor casing having an open end at the rear, and a revolvable armature shaft carrying a commutator, of a combined brush rigging and end cap assembly in two parts, one part comprising a pre-adjustable brush rigging fixedly secured in adjusted position across the open end of the motor casing and including a brush carrying disk located to hold brushes carried thereby on the commutator, said disk also carrying four rearwardly extending current carrying members, two of which are connected to the brushes and two of which provide field connections, the other part comprising an end cap carrying a current supply cable having a wire connected to each of four terminals disposed on the inner face of the end cap and spaced to cooperate with the current carrying members, said terminals and current carrying members being asymmetrically arranged, a bearing carried by one of said parts for supporting one end of the armature shaft, and means to secure the end cap in position beyond the brush carrying disk.

6. In a miniature motor, the combination with a stationary motor casing having an open end at the rear, and a revolvable armature shaft carrying a commutator, of a combined brush rigging and end cap assembly in two parts, one part comprising a preadjustable brush rigging fixedly secured in adjusted position across the open end of the motor casing and including a brush carrying disk located to hold brushes carried thereby on the commutator, said disk also carrying rearwardly extending current carrying members, the other part comprising an end cap carrying a current supply cable having wires connected to terminals disposed on the inner face of the end cap and spaced to co-operate with the current carrying members, a bearing support carried by the brush carrying disk, a bearing therein for supporting one end of the armature shaft, and a member threaded onto the bearing support and engaging the end cap to secure the latter in position beyond the brush carrying disk.

7. In a miniature motor, the combination with a stationary motor casing having an open end at the rear, and a revolvable armature shaft carrying a commutator, of a combined brush rigging and end cap assembly in two parts, one part comprising a pre-adjustable brush rigging fixedly secured in adjusted position across the open end of the motor casing and including a brush carrying disk located to hold brushes carried thereby on the commutator, said disk also carrying rearwardly extending current carrying members, the other part comprising an end cap carrying a current supply cable having wires connected to terminals disposed on the inner face of the end cap and spaced to cooperate with the current carrying members, a bearing support carried by the brush carrying disk, a bearing therein for supporting one end of the armature shaft, a member threaded onto the bearing support and engaging the end cap to secure the latter in position beyond the brush carrying disk, a plug carried by the end of the bearing support, and a spring pressed plunger between the plug and the end of the armature shaft.

8. In a miniature motor, the combination with a stationary motor casing having an open end at the rear, and a revolvable armature shaft carrying a commutator, of a combined brush rigging and end cap assembly in two parts, one part comprising a pre-adjustable brush rigging fixedly secured in adjusted position across the open end of the motor casing and including a brush carrying disk located to hold brushes carried thereby on the commutator, said disk also carrying four rearwardly extending current carrying members having split ends, the other part comprising an end cap carrying a current supply cable having wires connected to receptacle terminals disposed on the inner face of the end cap, said terminals spaced to receive the current carrying members, a bearing carried by one of said parts for supporting one end of the armature shaft, and means to secure the end cap in position beyond the brush carrying disk.

9. In a miniature motor, the combination with a stationary motor casing having an open end at the rear, and a revolvable armature shaft carrying a commutator, of a combined brush rigging and end cap assembly in two parts, one part comprising a pre-adjustable brush rigging fixedly secured in adjusted position across the open end of the motor casing and including a brush carrying disk located to hold brushes carried thereby on the commutator, said disk also carrying four rearwardly extending current carrying members having split ends, the other part comprising an end cap carrying a current supply cable having wires connected to receptacle terminals disposed on the inner face of the end cap, said terminals spaced to receive the current carrying members, a bearing carried by one of said parts for supporting one end of the armature shaft, and means to secure the end cap in position beyond the brush carrying disk, the inner face of the end cap and the exposed ends of said terminals being approximately in the same plane to facilitate passing the current carrying members into the terminals.

10. In a miniature motor, the combination with a motor having a casing open at the end, and an armature shaft carrying a commutator, of a brush rigging disk secured across the open end of the casing and carrying commutator brushes and field and armature terminals, a removable end cap having contacts cooperative with the terminals and carrying a current supply cable connected to the contacts, and means for supporting the end cap from the disk.

11. In a miniature motor, the combination with a motor having a casing open at the end, and an armature shaft, carrying a cylindrical type commutator, of a brush rigging disk secured across the open end of the casing and carrying commutator brushes adapted to exert radial pressure on the commutator, and field and armature terminals, a removable end cap having contacts cooperative with the terminals and carrying a current supply cable connected to the contacts, and means for supporting the end cap from the disk.

12. In a minature motor, the combination with a motor having a casing open at the end and an armature shaft carrying a commutator, of a brush rigging disk secured across the open end of the casing and carrying commutator brushes and field and armature terminals, a removable end cap having contacts cooperative with the terminals and carrying a current supply cable connected to the contacts, means for supporting the end cap from the disk, and a bearing for this armature shaft supported by the brush rigging disk.

13. In a miniature motor, an end cap, and a dually functioning disk of insulating material acting as a support for commutator brushes and field and armature terminals, and as a support for the end cap, the end cap carrying cooperative current supply terminals.

14. In a miniature motor, an end cap, a dually functioning disk of insulating material acting as a support for commutator brushes and field and armature terminals, and as a support for the end cap, the end cap carrying cooperative current supply terminals, and a shaft bearing carried by one of said parts.

HOWARD A. WHITESIDE.